United States Patent
Yuuki et al.

(10) Patent No.: US 7,397,521 B2
(45) Date of Patent: Jul. 8, 2008

(54) TWO SIDED LIQUID CRYSTAL DISPLAY DEVICE HAVING INDEPENDENTLY DRIVEN REFLECTIVE AND TRANSMITTING MEMBERS FOR DISPLAYING BOTH SIDES WITH DIFFERENT IMAGES AT THE SAME TIME

(75) Inventors: Akimasa Yuuki, Tokyo (JP); Naoki Nakagawa, Tokyo (JP); Naoko Iwasaki, Tokyo (JP); Shin Tahata, Tokyo (JP); Keiichi Ito, Tokyo (JP); Tomohiro Sasagawa, Tokyo (JP); Takashi Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 19 days.

(21) Appl. No.: 10/544,845

(22) PCT Filed: Feb. 12, 2004

(86) PCT No.: PCT/JP2004/001456

§ 371 (c)(1),
(2), (4) Date: Mar. 30, 2006

(87) PCT Pub. No.: WO2004/072717

PCT Pub. Date: Aug. 26, 2004

(65) Prior Publication Data

US 2006/0170844 A1    Aug. 3, 2006

(30) Foreign Application Priority Data

Feb. 14, 2003    (JP)    ............................... 2003-036222

(51) Int. Cl.
*G02F 1/1335* (2006.01)
(52) U.S. Cl. .......................................... 349/63; 349/65

(58) Field of Classification Search .................. 349/48, 349/113, 114, 63, 65, 96
See application file for complete search history.

(56) References Cited

U.S. PATENT DOCUMENTS 6,574,487 B1 *    6/2003    Smith et al. .................. 455/566

(Continued)

FOREIGN PATENT DOCUMENTS

EP    1 209 513    5/2002

(Continued)

OTHER PUBLICATIONS

U.S. Appl. No. 10/585,201, filed Jul. 3, 2006, Yuuki et al.

*Primary Examiner*—David C. Nelms
*Assistant Examiner*—John Heyman
(74) *Attorney, Agent, or Firm*—Oblon, Spivak, McClelland, Maier & Neustadt, P.C.

(57) ABSTRACT

A liquid crystal display according to the present invention includes: a liquid crystal cell 10, in which pixels having independently driven reflecting and transmitting members are arranged in a matrix, that is composed of a first substrate 15, a second substrate 17 having pixel driving members, and a liquid crystal 16 sandwiched between the first substrate 15 and the second substrate 17; a first polarizing means 13 disposed facing the first substrate 15; a second polarizing means 19 disposed facing the second substrate 17; a first front light 6 disposed outside the first polarizing means 13; and a second front light 7 disposed outside the second polarizing means 19. Owing to the configuration of the display, images can be displayed on both sides of the liquid crystal display.

9 Claims, 8 Drawing Sheets

U.S. PATENT DOCUMENTS

| | | | |
|---|---|---|---|
| 6,674,496 B2 * | 1/2004 | Wei | 349/63 |
| 6,806,929 B2 * | 10/2004 | Chen et al. | 349/114 |
| 6,829,025 B2 * | 12/2004 | Sakamoto | 349/114 |
| 2003/0160919 A1 * | 8/2003 | Suzuki et al. | 349/113 |
| 2004/0027511 A1 * | 2/2004 | Doe | 349/63 |
| 2006/0170844 A1 | 8/2006 | Yuuki et al. | |

FOREIGN PATENT DOCUMENTS

| | | |
|---|---|---|
| JP | 2000-193956 | 7/2000 |
| JP | 2002-357825 | 12/2002 |
| JP | 2003-8707 | 1/2003 |
| JP | 2003-21836 | 1/2003 |
| JP | 2003-35893 | 2/2003 |

* cited by examiner

TWO SIDED LIQUID CRYSTAL DISPLAY DEVICE HAVING INDEPENDENTLY DRIVEN REFLECTIVE AND TRANSMITTING MEMBERS FOR DISPLAYING BOTH SIDES WITH DIFFERENT IMAGES AT THE SAME TIME

TECHNICAL FIELD

The present invention is related to liquid crystal displays through which displaying images are viewable from both front and back sides, and to information devices, such as mobile telephones, personal digital assistance (PDA), and wrist watches, in which the liquid crystal displays are used.

BACKGROUND ART

In conventional liquid crystal displays, each of reflective-type liquid crystal displays and half-transparent-reflective-type liquid crystal displays has only one displaying face.

Therefore, two liquid crystal displays have been needed for displaying on both sides of mobile telephones and the like. As a result, there have been problems in that displaying units become thick and heavy, in addition, their cost is increased due to using the two liquid crystal displays.

In order to solve the above problems, the following display that can display on both sides thereof with one liquid crystal display, is described in Japanese Laid-Open Patent Publication 2000-193956. The display includes; a liquid crystal that is sandwiched between a first pair of reflection-polarizing members and a first absorption-polarizing member, and a second pair of reflection-polarizing members and a second absorption-polarizing member; and a light guiding plate fitted on the outmost side.

When the liquid crystal display that can display images on both sides, or an electronics device using the display is operated to display an image on one side, another image can not be displayed on the opposite side because it has only one driving means for one pixel. Moreover, when the liquid crystal display is operated to display an image on one side, light is leaked to the opposite side, causing a problem in that the image is viewed from the opposite side.

An objective of the present invention that has been made in order to solve the above problems is to provide a liquid crystal display capable of displaying, while an image being displayed on one side, another image on the opposite side. Moreover, another objective of the present invention is to provide a liquid crystal display that can prevent the image from being viewed from the opposite side.

DISCLOSURE OF THE INVENTION

A liquid crystal display relating to a first configuration of the invention comprises: a liquid crystal cell, in which pixels having independently driven reflecting and transmitting members are arranged in a matrix, that is composed of a first substrate, a second substrate having pixel driving members, and a liquid crystal sandwiched between the first substrate and the second substrate; a first polarizing means disposed facing the first substrate; a second polarizing means disposed facing the second substrate; a first front light disposed outside the first polarizing means; and a second front light disposed outside the second polarizing means, thereby, the liquid crystal display can display images on both sides thereof.

Moreover, a liquid crystal display relating to a second configuration of the invention drives independently the reflecting members and the transmitting members in the first configuration and displays images on both sides of the liquid crystal display, thereby, the liquid crystal display can display different images on both sides at the same time.

A liquid crystal display relating to a third configuration of the invention displays black with the reflecting members in the second configuration, thereby, the liquid crystal display does not leak light to the opposite side while an image is displayed on only one side, so that the image can be prevented from being viewed from the opposite side.

A liquid crystal display relating to a fourth configuration of the invention displays white with the reflecting members in the second configuration, thereby, the opposite side can be used as illumination, when an image is displayed on only one side.

A liquid crystal display relating to a fifth configuration of the invention includes a reflection-polarizer film between the second substrate and the second polarization means in the first configuration, thereby, images can be displayed more brightly when they are displayed on both sides.

An information device relating to a sixth configuration of the invention includes a displaying means that is a liquid crystal display as recited in claim 1, thereby, an information device capable of displaying various information items on both sides can be obtained.

An information device relating to a seventh configuration of the invention further comprises: a first main unit; a second main unit, having a displaying means, connected to the first main unit openably and closably with respect to the first main unit; and an open/close judgment means for judging whether the second main unit is open or closed, in which the first front light is lighted when the second main unit is open in the sixth configuration, thereby the information device can automatically display images on the both sides.

BEST MODE FOR CARRYING OUT THE INVENTION

Hereinafter, concrete embodiments of the invention are explained according to diagrams, referring to foldable mobile telephones as the examples therefore.

Embodiment 1

Figure 1:
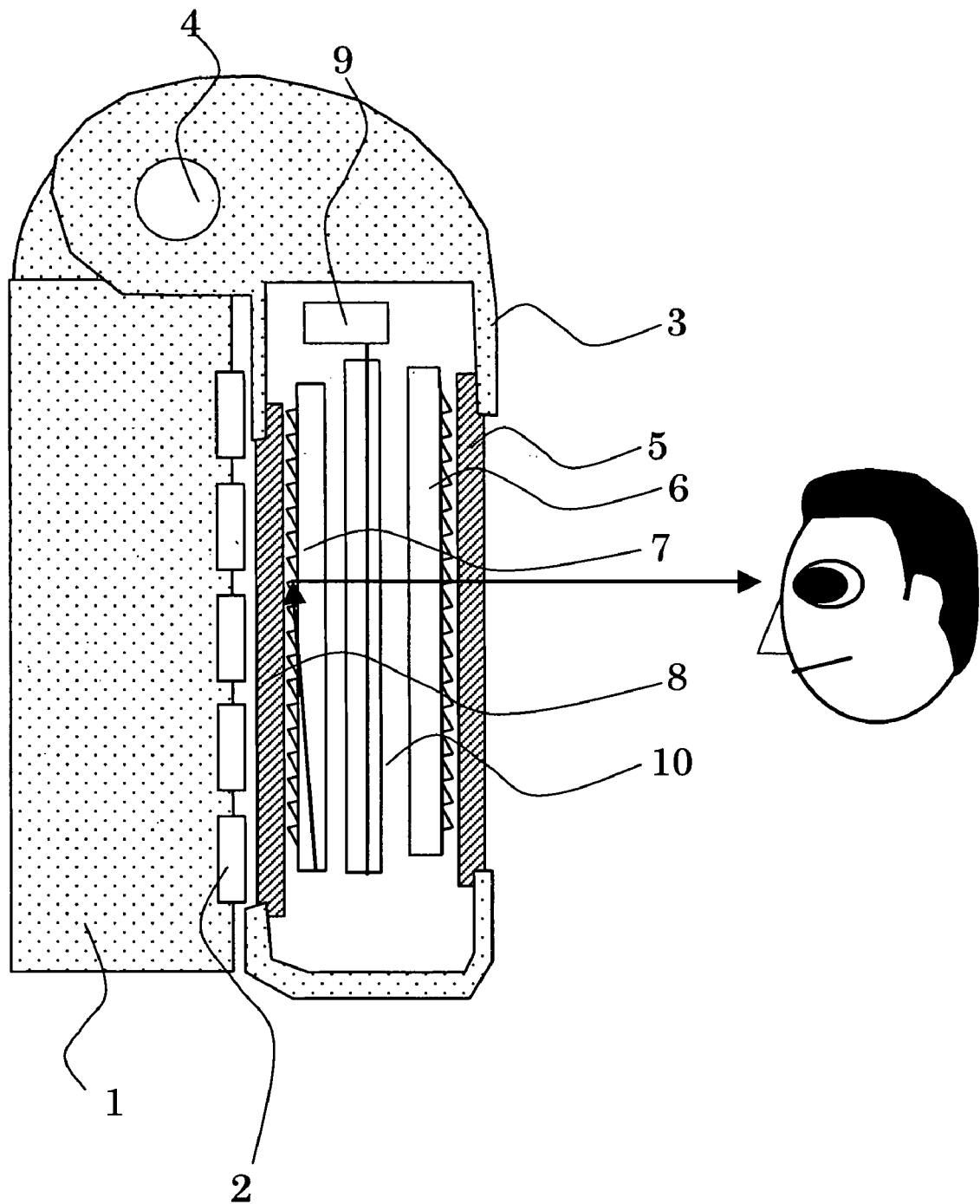
FIG. 1 is an outline cross-sectional view for explaining a liquid crystal display and an information device using the display according to Embodiment 1 of the invention, and illustrating, with a partial cross-sectional view, a state in which a foldable mobile telephone, as one of information devices, is closed (a second main unit is closed)
Figure 2:
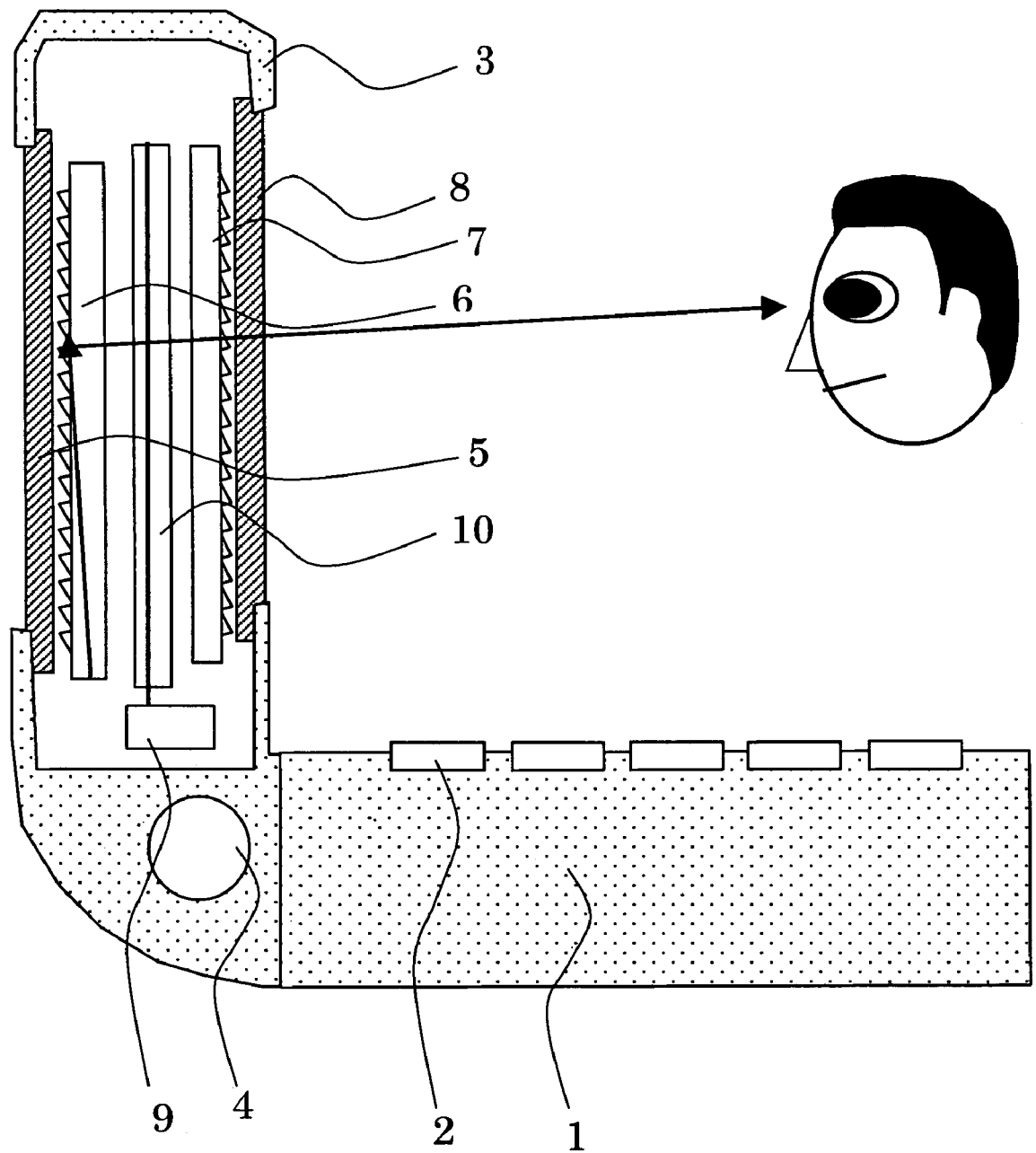
FIG. 2 is an outline plane view for explaining the liquid crystal display and the information device using the display according to Embodiment 1 of the invention, and illustrating, with the partial cross-sectional view, a state in which the second main unit is open.

In FIG. 1 and FIG. 2, a mobile telephone according to Embodiment 1, comprises: a first main unit "1" including various function switches "2" having character or numerical input switches; and a second main unit "3" including a liquid crystal display "10" for visibly displaying various information items. The first main unit 1 and the second main unit 3 are openably and closably connected with a hinge "4". Moreover, apertures (windows) are formed on both inner and outer faces that direct inward and outward, respectively, when the second main unit 3 is closed, and an outer transparent cover "5" is fitted on the outer aperture; an inner transparent cover "8" is fitted on the inner aperture. Each of front lights is disposed on the inner and outer apertures, facing each aperture, in the liquid crystal display 10. Moreover, the liquid crystal display 10 is operated by signals from a driving circuit "9".

Figure 3:
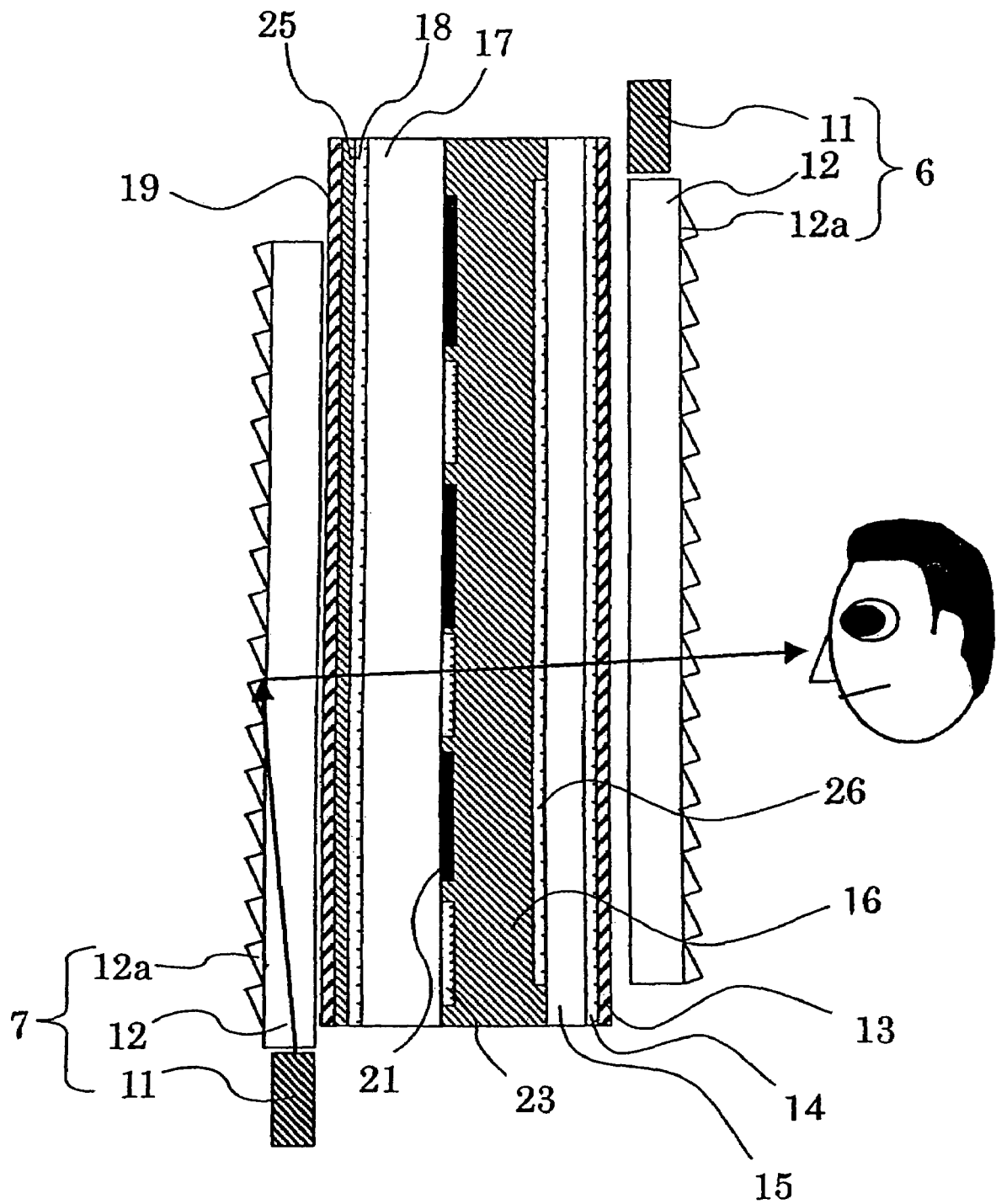
FIG. 3 is a cross-sectional view of a major portion for explaining the liquid crystal display and the information device using the display according to Embodiment 1 of the invention, and for explaining the displaying operation with transmitting light, when the second main unit is closed.

The liquid crystal display 10 according to Embodiment 1 will be explained in detail using FIG. 3. A transparent first substrate "15" on which a first transparent electrode "26" is formed, and a transparent second substrate "17", facing the first substrate 15, on which a second transparent electrode "23" and a reflection electrode "21" are formed, are disposed on both sides of a liquid crystal "16", so as to constitute a liquid crystal cell. A first phase retardation plate "14" and a first polarizer film "13" are sequentially fitted on the first substrate 15 facing the liquid crystal 16, and a second phase retardation plate "18" and a second polarizer film "19" are sequentially fitted on the second substrate 17 facing the liquid crystal 16. A first front light "6" is disposed outside the first polarizer film "13"; and a second front light "7" is disposed outside the second polarizer film "19".

Moreover, a reflection-polarizer film "25" may be fitted between the second phase retardation plate 18 and the second polarizer film 19. The operations of the display in the case of fitting the reflection-polarizer film 25 will be described later.

Each of the first front light 6 and the second front light 7 includes a front light guiding plate "12", where a reflecting prism "12a" is fitted on the opposite side of the liquid crystal 16, and a light source "11" using, for example, a light-emitting diode. The front light guiding plate 12 is made of, for example, acrylic resin, Arton™ resin, or Zeonor™ resin by injection molding.

The first substrate 15 including the first transparent electrode 26 made of, for example, indium-titanium oxide (ITO) is made of, for example, transparent glass or organic resin. Moreover, the liquid crystal 16 that is sandwiched between the first substrate 15 and the second substrate 17 is made of, for example, a twisted nematic liquid crystal. Furthermore, the reflection electrode 21 made of aluminum or silver, the second transparent electrode 23 made of ITO, and a thin-film transistor (not illustrated) transmitting electric potential of a source wiring (not illustrated) to the reflection electrode 21 and the second transparent electrode 23 in accordance with signals from gate wirings (not illustrated), are fitted on the same side of the second substrate 17. A pixel is composed of the adjacent reflection electrode 21 and the second transparent electrode 23, and each of the pixels is disposed in a matrix. The adjacent reflection electrode 21 and the second transparent electrode 23 are insulated from each other, each of which includes a thin-film transistor (not illustrated), and can be independently controlled through different wirings.

The first polarizer film 13 is an absorption-polarizer film plate that transmits polarized light having a polarization plane in a transmission-axis direction and absorbs polarized light having a polarization plane in an absorption-axis direction being different from the transmission axis direction. Moreover, light passes through the first phase retardation plate 14, undergoing a quarter-wavelength phase shift.

The second phase retardation plate 18, which has a function to assure a phase difference of approximately quarter-wavelength, is formed by laminating a quarter-wavelength phase retardation plate and a half-wavelength phase retardation plate. Moreover, the second polarizer film 19 is the same absorption-type polarizer film as the first polarizer film 13. Furthermore, when the reflection-polarizer film 25 is provided, the plate 25 is disposed with the transmission axis direction of the second polarizer film 19 being aligned in such a way that linearly polarized light in the transmission axis direction of the plate 19 is transmitted, whereas polarized light whose polarizing direction is perpendicular to the transmission axis direction is reflected.

Next, the structure of thin-film transistors, wirings, and electrodes that are formed on the second substrate 17, will be explained in more detail using FIG. 6 and FIG. 7.

Figure 6:
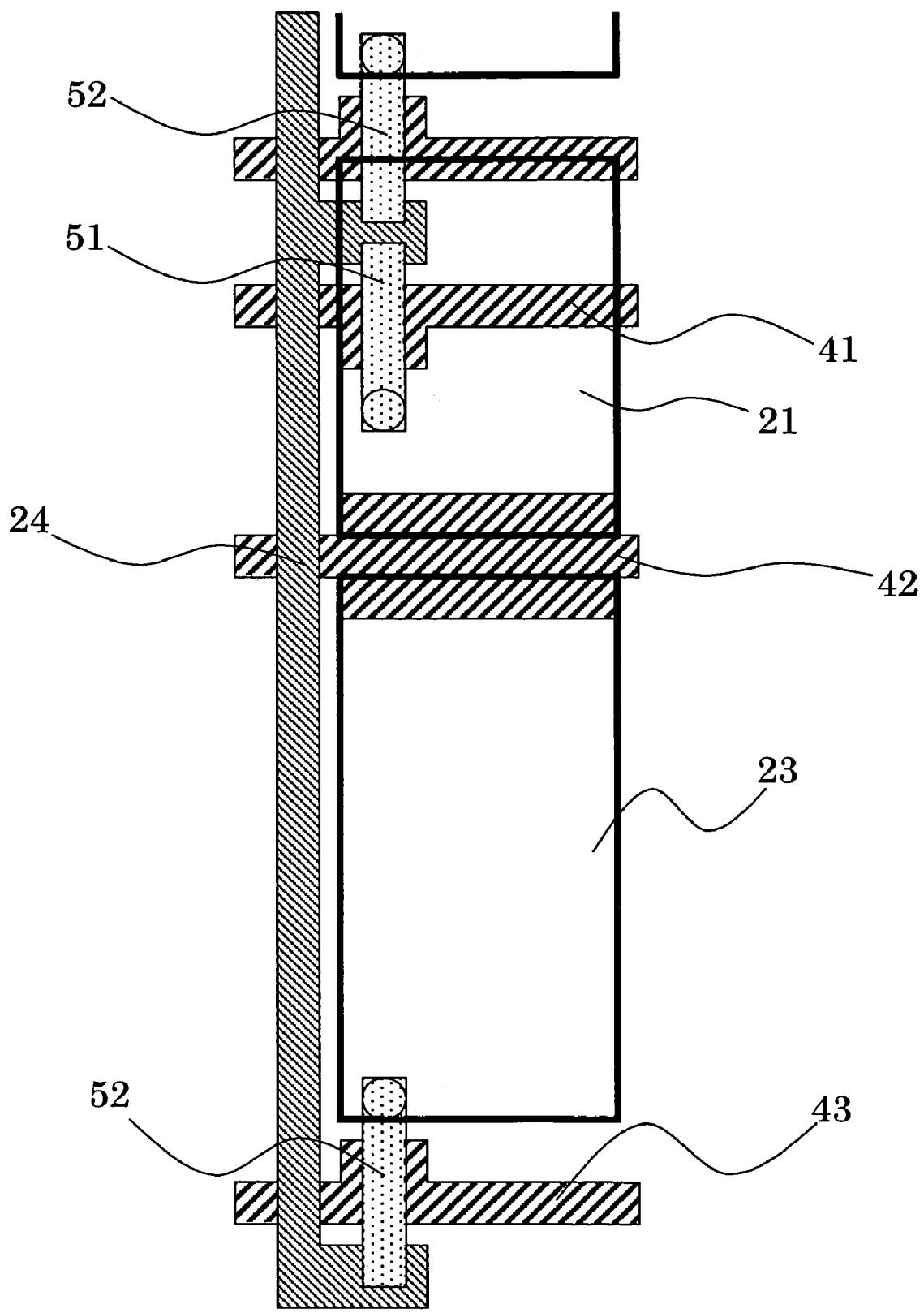
FIG. 6 is a plane view illustrating a pixel portion of a liquid crystal display panel of a liquid crystal display according to the invention.

FIG. 6 is a plane view illustrating a pixel formed on the second substrate 17. A gate wiring "41" for a reflecting member, a CS wiring "42", and a gate wiring "43" for a transmitting member are arranged in parallel with each other, and a source wiring "24" is formed in a direction perpendicular to the above wirings. A first thin-film transistor "51" is connected to the gate wiring 41 for a reflecting member, the source wiring 24, and the reflection electrode 21. Moreover, a second thin-film transistor "52" of an adjacent pixel is connected to the gate wiring 43 for a transmitting member, the source wiring 24, and the second transparent electrode 23. Furthermore, the CS wiring 42 for giving a load capacitance to each of the pixels is arranged on the border portion between the reflection electrode 21 and the second transparent electrode 23 in the same pixel, and the CS wiring 42 is shared by the reflection electrode 21 and the second transparent electrode 23 within the same pixel.

Because the CS wiring 42 formed on the second substrate 17 is commonly used, the number of CS wirings can be decreased. Therefore, areas for the reflection electrode 21 and the second transparent electrode 23, which are used for displaying, can be increased. Thereby, brighter images can be displayed.

Moreover, the first thin-film transistor 51 and the second thin-film transistor 52 of the adjacent pixel are formed underneath the reflection electrode 21.

By forming, underneath the reflection electrode 21, a transistor for driving a pixel, areas for the reflection electrode 21 and the second transparent electrode 23, which are used for displaying, can be increased. Thereby, brighter images can be displayed.

Figure 7:
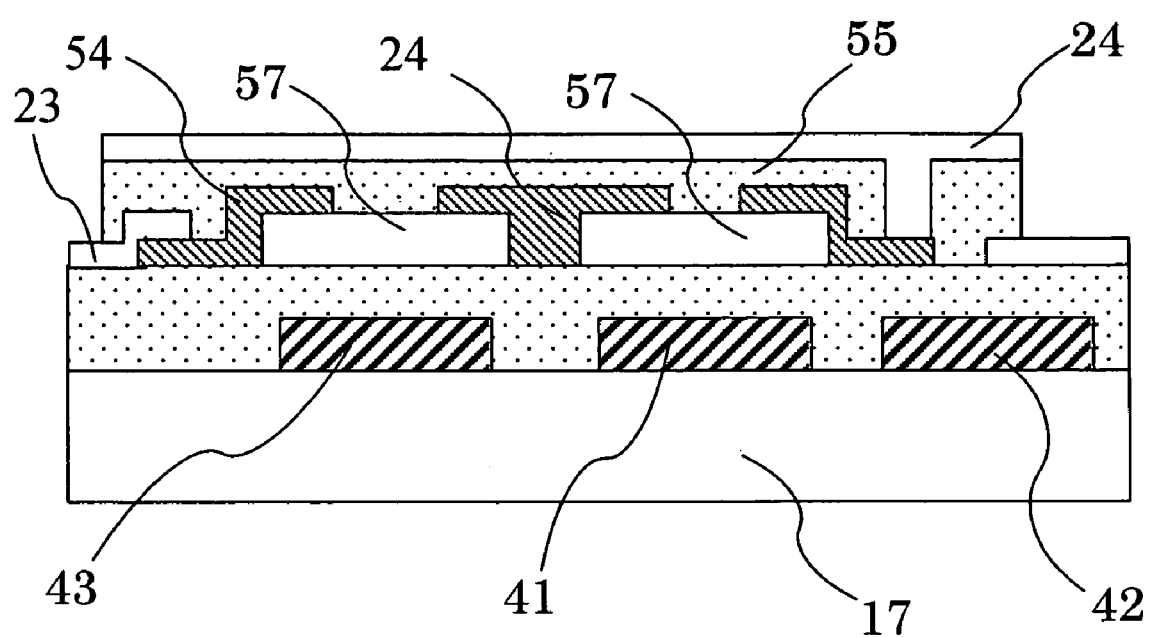
FIG. 7 is a cross-sectional view illustrating a pixel portion of a liquid crystal display panel of a liquid crystal display according to the invention.

Next, a method of forming the thin-film transistors, wirings, and electrodes, which are formed on the second substrate 17, will be explained using FIG. 7 illustrating a cross-sectional structure of the each of the pixels. After a silicon nitride film (not illustrated) has been formed on the second substrate 17 made of glass and waterproof and prevention of impurities diffusion-processed, firstly, chromium or aluminum formed by a sputter deposition method is processed by using lithography, so that the gate wiring 41 for the reflecting member, the gate wiring 43 for the transmitting member, and the CS wiring 42 are formed at same time. Secondly, after a silicon dioxide film as a gate oxide film "56" has been formed on the whole area, an amorphous silicon film is deposited, so that a channel "57" between the first thin-film transistor 51 and the second thin-film transistor 52 is formed by using the lithography. Thirdly, the chromium or the aluminum formed by the sputter deposition method is processed by using the lithography to form the source wiring 24 and a drain "54" of the transistor. An electrode pad 60 of storage capacitor CS for reflection electrodes is formed at the same time. Then, an ITO (indium tin oxide) film, as a transparent conducting film, is deposited, and the source wiring 24 and the drain 54 are formed, by using the sputter deposition method, on the same layer of the gate oxide film 56 in order to connect the second transparent electrode 23 with the drain 54 of the first thin-film transistor 51.

Following these processes, a planarized film "55" is formed on the area on which the reflection electrode 21 is formed, by using a silicon dioxide film or an acrylic organic polymer material, in order to cover the first thin-film transistor 51 and the second thin-film transistor 52, then, the reflection electrode 21 is formed, using aluminum or silver, in a position on the planarized film 55 in such a way that the reflection electrode covers the first thin-film transistor 51 and the second thin-film transistor 52 on the planarized film 55.

Next, the operations of a liquid crystal display according to Embodiment 1 and a foldable mobile telephone equipped with the display, in the states of the second main unit 3 being open or closed, will be separately explained in each of the cases in which the display is placed in dark and bright surroundings.

Firstly, an example case will be explained in which the second main unit 3 of the foldable mobile telephone is open, the surroundings of the display are dark, and the second front light 7 is turned on. As illustrated in FIG. 1, a user views a screen from the first front light 6 side of the liquid crystal display 10. In FIG. 1, light "Lf1" emitted from the second front light 7 illuminates the double-sided-display-type liquid crystal panel 10 from the back and then passes through the panel and the outer transparent cover 5 to reach the user.

The operations will be explained in detail using FIG. 3. The light emitted from the light source 11 of the second front light 7 spreads and transmits through the light guiding plate 12 of the second front light 7 to reach the reflecting prism 12a fitted on the light guiding plate 12. The reflecting prism 12a is composed of a face that is inclined one through three degrees with respect to the displaying face of the double-sided-display-type liquid crystal panel 10, and another face that is inclined forty through fifty degrees to the displaying face, and thereby, the light illuminating the face that is inclined forty through fifty degrees and faces the light source 11, is transmitted to the liquid crystal 16 and is reflected thereon. The light is converted into linearly polarized light in the second polarizer film 19, transmits through the second phase retardation plate 18, and further transmits through the second transparent electrode 23. At that time, a polarization state of the light is varied in accordance with the summed-up birefringence amount of the second phase retardation plate 18, the liquid crystal 16, and the first phase retardation plate 14, and the light transmits through the first polarizer film 13 with a transmittance in accordance with the polarization state. At this time, the birefringence amount of the liquid crystal 16 can be controlled by orienting the liquid crystal 16 by an electric field generated between the second transparent electrode 23 and the first transparent electrode 26. Therefore, the transmittance of the first polarizer film 13 can be controlled by applying an electric voltage to the second transparent electrode 23, so that the transmittance can be realized in accordance with images to be displayed.

In this Embodiment 1, the material and thickness of the liquid crystal 16, the birefringence amount and the directions of the first phase retardation plate 14 and the second phase retardation plate 18, and the directions of the polarizer film are designed in such a way that the light is linearly polarized in the transmission-axis direction of the first polarizer film 13 when the electric field is not applied to the liquid crystal, and the light is linearly polarized in a direction perpendicular to the transmission axis of the first polarizer film 13 when an electric voltage "Vh" is applied.

However, the design is not limited to those described above, but, on the contrary, the directions may be designed in such a way that the light is linearly polarized in a direction perpendicular to the transmission axis of the first polarizer film 13 when the electric field is not applied to the liquid crystal, and the light is linearly polarized in the transmission axis direction of the first polarizer film 13 when the electric voltage Vh is applied.

Moreover, the light transmitted through the first polarizer film 13 transmits through the first front light 6. The reflecting prism 12a of the first front light 6 is composed of a face that is inclined one through three degrees with respect to the display face, and another face that is inclined forty through fifty degrees with respect to the displaying face, and thereby, more than ninety percent of the light passes through the first front light 6. Although the advancing direction of the light is slightly varied, the light directly passes through the outer-transparent cover 5 and is recognized by the user.

Meanwhile, if the reflection-polarizer film 25 is provided, part of light reflected on the reflecting prism 12a is reflected on the back side of the reflection electrode 21, the gate wiring (not illustrated), the source wiring (not illustrated), or the thin-film transistor (not illustrated), and passes twice through the second phase retardation plate 18 having a phase-retardation of quarter-wavelength, so as to be linearly polarized light of which polarizing direction has been rotated ninety degrees; therefore, the linearly polarized light is reflected on the reflection-polarizer film 25, part of which passes through the second transparent electrode 23. This light is linearly polarized light whose polarizing direction is perpendicular to the light that passes through the reflection-polarizer film 25. In other words, two light beams whose polarizing direction has been rotated ninety degrees with respect to each other transmit through the liquid crystal at the same time. Therefore, even if the polarizing direction is varied by applying an electric voltage to the second transparent electrode 23, desired light transmittance is not obtained, resulting in the display contrast being reduced.

Therefore, it is effective for gaining high contrast that a light-shielding function made of a material having low reflectance is applied, for controlling the light reflection, onto the glass-substrate side of the gate wiring, the source wiring, the reflection electrode 21, and other structural members.

In more particular, it is effective that a light-shielding film, such as a chrome oxide film or a chrome film, is provided on the area except that for the second transparent electrode 23.

Moreover, it may be possible in order to omit a patterning process that a gate wiring is used, whose glass-substrate side is made of a chrome oxide film having low reflectance, and which is formed together with aluminum layer in a double-layered film, in order to increase electrical conductivity of the wiring, and the gate wiring is embedded underneath the source wiring, the reflection electrode 21, and other structural members, so that the gate wiring can be used as a light-shielding plate on the glass-substrate side.

Figure 4:
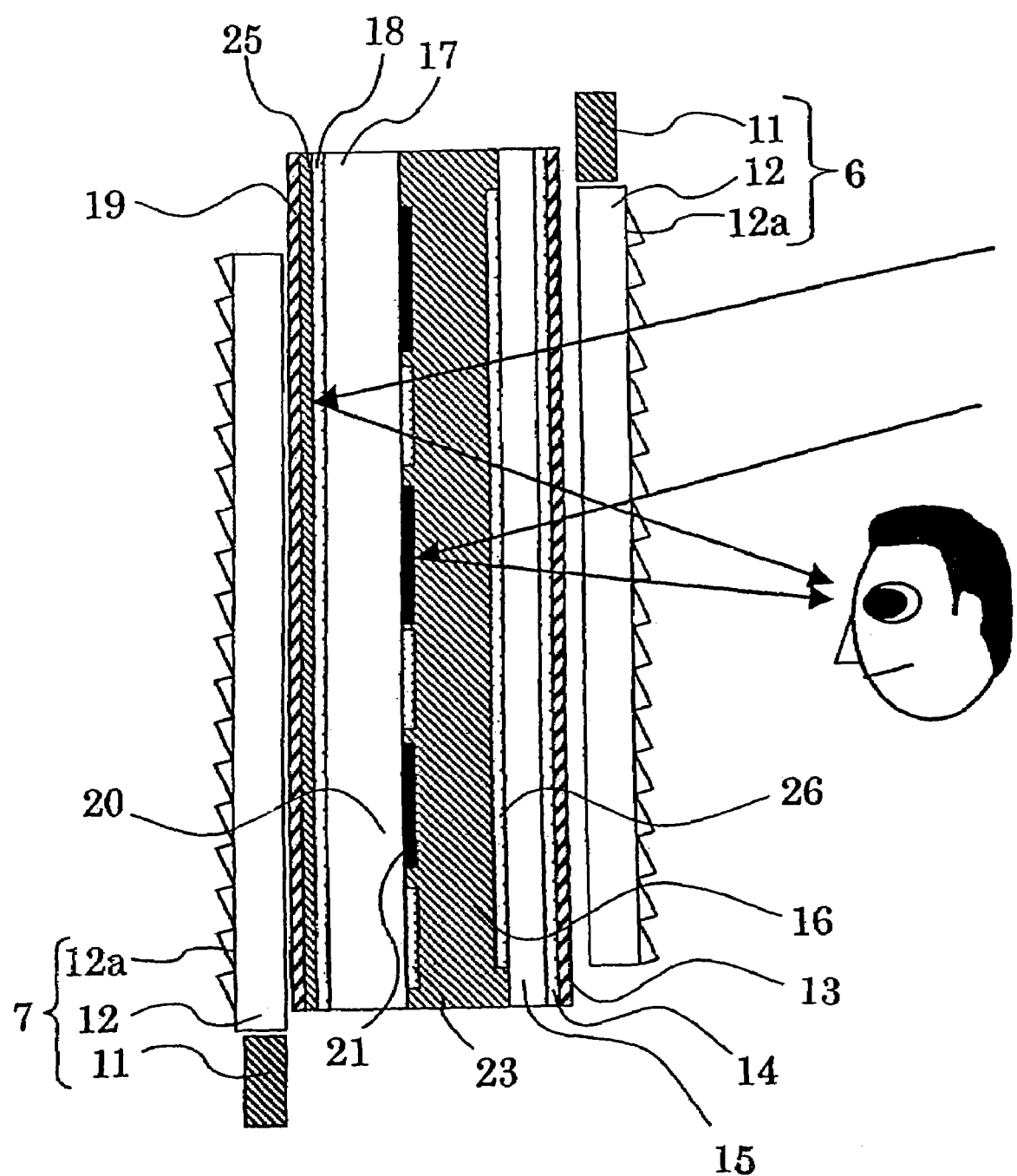
FIG. 4 is a cross-sectional view illustrating the liquid crystal display according to Embodiment 1 of the invention, and particularly, for explaining the displaying operation with reflecting light.

Next, another example case will be explained, in which the second main unit 3 of the foldable mobile telephone is closed, and, because the display is placed in bright surroundings, the second front light 7 is turned off. In FIG. 4, outside light transmitted through the first front light 6 is converted into linearly polarized light by the first polarizer film 13. Next, the light transmits through the first phase retardation plate 14 and the liquid crystal 16, is reflected on the reflection electrode 21, transmits again through the liquid crystal 16 and the first phase retardation plate 14, and reaches the first polarizer film. At that time, because the outside light transmits twice through the first phase retardation plate 14 and the liquid crystal 16, the polarization state of the outside light is varied in accordance with the total birefringence amount. Next, the outside light transmits through the first polarizer film 13 with a transmittance in accordance with the polarization state.

In this Embodiment 1, the material and thickness of the liquid crystal 16, the birefringence amount and direction of the first phase retardation plate 14, and the directions of the polarizer film are designed in such a way that the outside light is linearly polarized in the transmission-axis direction of the first polarizer film 13 when the electric field is not applied to the liquid crystal, and the light is linearly polarized in the direction perpendicular to the transmission axis of the first polarizer film 13 when the electric voltage Vh is applied.

Because the outside light is incident from whole area of the double-sided-display-type liquid crystal panel 10 when the reflection-polarizer film 25 is fitted, part of the outside light is not reflected on the reflection electrode 21 after transmitted through the first polarizer film 13 and the first phase retardation plate 14, and transmits through the second transparent electrode 23. The outside light that has transmitted through this second transparent electrode 23 transmits through the second phase retardation plate 18, and then reaches the reflection-polarizer film 25. At this time, if the electric voltage Vh is applied to the second transparent electrode 23, the outside light is converted into linearly polarized light polarized in a direction perpendicular to the transmission axis of the reflection-polarizer film 25, the outside light can not transmit through the reflection-polarizer film 25, resulting in being reflected. Although the reflected outside light transmits through the second phase retardation plate 18, the liquid crystal 16, and the first phase retardation plate 14, and reaches the first polarizer film 13 again, the outside light can transmit through the plate 13, because the outside light has returned to linearly polarized light polarized in the same direction as the transmission axis of the first polarizer film 13. Therefore, because the second transparent electrode 23 is operated as a reflection electrode when the electric voltage Vh is applied to the electrode, a high reflectance can be expected. In other words, a white screen in which the transparent electrode has high reflectance can be displayed for outside light from the first front light side, by applying a voltage zero to the reflection electrode 21 and the voltage Vh to the second transparent electrode 23.

In other words, a white screen in which the transparent electrode has higher reflectance can be displayed by providing the reflection-polarizer film 25.

Next, another example case will be explained using FIG. 2, in which the second main unit 3 of the foldable mobile telephone is open, the display is placed in dark surroundings, and the first front light 6 is turned on. As illustrated in FIG. 2, when the second main unit 3 is open, a user views the screen through the face of the second front light 7 side of the liquid crystal display 10.

The foldable mobile telephone according to Embodiment 1 comprises a front light switch (not illustrated) for lighting the first front light 6 when the second main unit 3 is judged, by an open-close judging means (not illustrated), to be in the open state, thereby, if the open-close judging means detects, by detecting, for example, an angle by the hinge 4, the second main unit 3 in the open state, the first front light 6 is automatically turned on, and the user recognizes an displaying image, by illuminating the double-sided-display-type liquid crystal panel 10 from the back side thereof.

Thereby, images can be automatically displayed on both sides.

Figure 5:
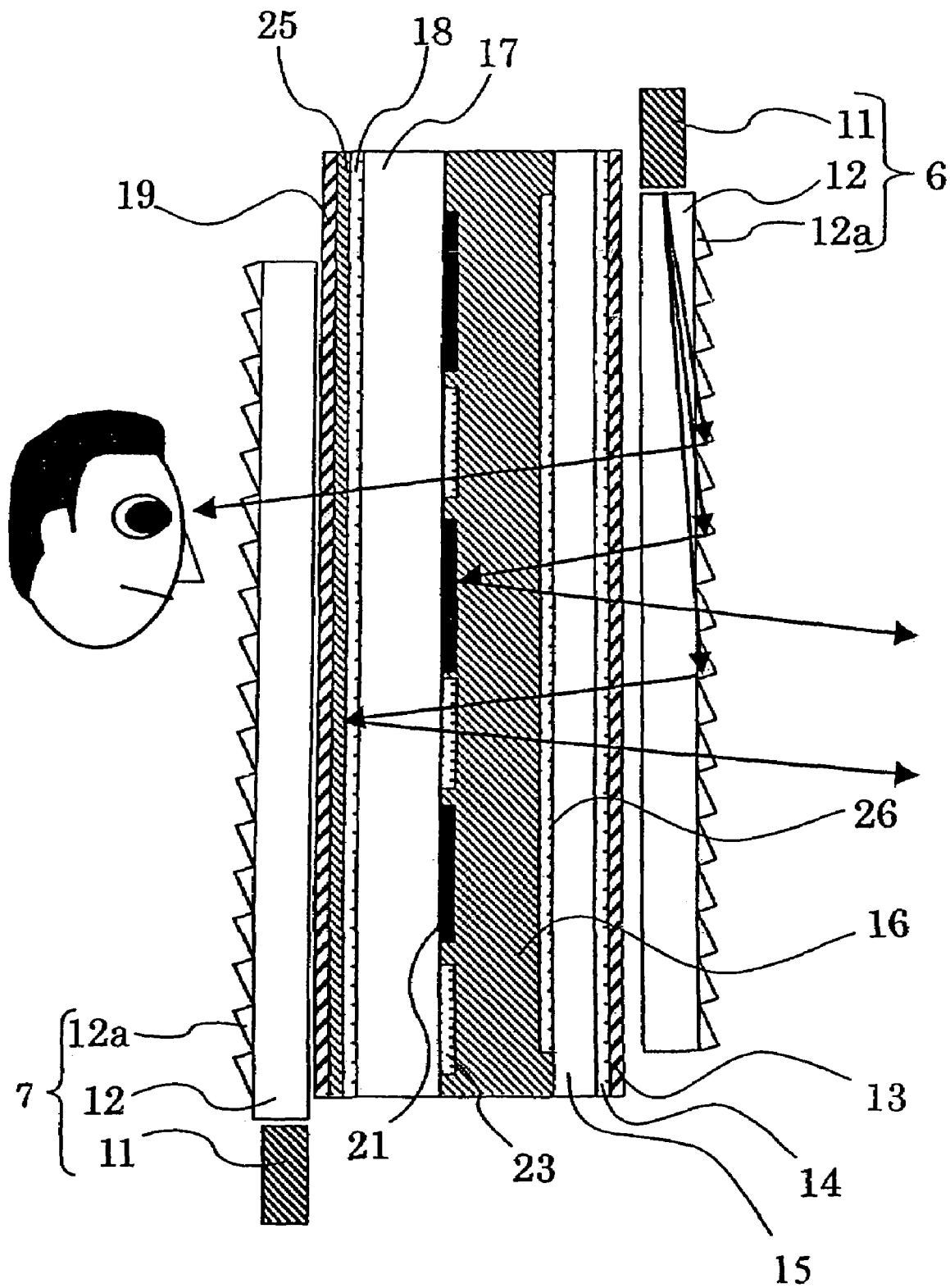
FIG. 5 is a cross-sectional view illustrating the liquid crystal display according to Embodiment 1 of the invention, in which the major portion in FIG. 1 is enlarged for explaining the operation of displaying, with reflecting light, on the opposite side.

By using FIG. 5, the operations will be explained in more detail. Light emitted from the light source 11 of the first front light 6 spreads and transmits in the light guiding plate 12 of first front light 6, and illuminates the reflecting prism 12a formed on the light guiding plate 12. The reflecting prism 12a is composed of a face that is inclined one through three degrees with respect to the displaying face of the double-sided-display-type liquid crystal panel 10, and another face is inclined forty through fifty degrees with respect to the displaying face, and light reached the another face that faces the light source 11 and is inclined forty through fifty degrees, is directed toward the liquid crystal 16 and is reflected thereon. The reflected light is converted into linearly polarized light in the first polarizer film 13. Next the light transmits through the first phase retardation plate 14, the liquid crystal 16, and the second transparent electrode 23. Furthermore, the light transmits through the second phase retardation plate 18 and reaches the second polarizer film 19. At that time, a polarization state of the light is varied in accordance with the birefringence amount, which is the summed-up amount of refraction of the second phase retardation plate 18, the liquid crystal 16, and the first phase retardation plate 14, and the light transmits through the second polarizer film 19 with a transmittance in accordance with the polarization state.

At this time, the birefringence amount of the liquid crystal 16 can be controlled by orienting the liquid crystal 16 by an electric field generated between the second transparent electrode 23 and the first transparent electrode 26. Therefore, the transmittance of the second polarizer film 19 can be controlled by applying a suitable electric voltage to the second transparent electrode 23, so that the transmittance of each pixel corresponding to an image to be displayed can be realized.

However, in this case, part of incident light from the first front light 6 is reflected on the reflection electrode 21, and is leaked to the first front light 6 side. Therefore, there rises a problem in that the displaying image is viewed by a third person standing in front of the user.

In this Embodiment, although one pixel is composed of the reflection electrode 21 of a pixel adjacent to it and the second transparent electrode 23, the electrodes are insulated from each other and can be independently controlled. Therefore, an image viewed by the user can be prevented, by independently controlling electric voltages applied to the second transparent electrode 23 and the reflection electrode 21, from being viewed by the third person standing in front of the user.

This operation will be more concretely explained. A constant electric voltage is applied to the reflection electrode 21, and an electric voltage for realizing transmittance in accordance with image data is applied to the second transparent electrode 23.

Thereby, status of the liquid crystal on the reflecting electrode 21 becomes uniform over the whole screen, and the reflected image is not displayed, so that the displaying image is not viewed by the third person standing in front of the user. On the other hand, because the liquid crystal on the second transparent electrode 23 realizes each of the transmittances in accordance with images, a normal transmission image is displayed to the user.

Moreover, in this case, if an electric voltage is applied to the reflection electrode 21 to realize the birefringence amount in which the light reflected by the liquid crystal 16 by means of the reflection electrode 21 transmits through the first polarizer film 13, the light outputted from the first front light 6 is emitted to the opposite side of the user. The emitted light can be used as illumination when an object is photographed by the camera installed in the mobile telephone.

Moreover, in a case in which the reflection-polarizer film 25 is provided, when an image is displayed, an electric voltage is applied, according to the image data, to realize the transmittance with the timing of applying an electric voltage to the second transparent electrode 23. At that time, the amount of light, from image data, that is transmitted through the second transparent electrode 23 and reflected from the reflection-polarizer film 25, is calculated, so that an electric voltage applied to the reflection electrode 21 is determined in such a way that an approximately constant amount of light is reflected according to the amount of light reflected from the reflection-polarizer film 25, with the timing of applying the electric voltage to the reflection electrode 21.

Thereby, the reflected image is not displayed and the displaying image is not viewed by the third person standing in front of the user, because the reflection image on the transmitting member is overlapped with reflection light from the reflecting member, and approximately uniform reflection light is emitted from each of the pixels of the whole screen.

Those data processes are enabled by data conversion algorithm using a semiconductor circuit for driving. Because the volume of required frame memory is not increased, the cost increase of the semiconductor circuit for driving is small.

Next, another example case will be explained using FIG. 5, in which the second main unit 3 of the foldable mobile telephone is open, and the display is placed in bright surroundings. As illustrated in FIG. 5, when the second main unit 3 is open, the second front light 7 side of the double-side-display-type liquid crystal panel 10 is viewed from the user. The first front light 6 is turned on, because there is no pixel reflecting outside light. The operations are similar to the case in which the display is placed in dark surroundings. In this operation, if the reflection-polarizer film 25 is provided and liquid crystal display is viewed from the second front light 7 side, outside light that has entered the second substrate 17 and reflected on the gate wiring and the reflection electrode 21, is transmitted twice through the second phase retardation plate 18 and converted into linearly polarized light of which polarizing direction is rotated ninety degrees. Therefore, because outside light can not be transmitted through the reflection-polarizer film 25, the display contrast is no longer decreased.

In the above explanation, although a mobile telephone is exemplified, it is not limited to this example. If an information device is composed of a first main unit having various kind of operational switches and a second main unit having display means for displaying various information, and the second main unit is openable and closable with respect to the first main unit, the device can be similarly structured and similar effects can be resultantly obtained even if the device is, for example, a foldable PDA, an openable and closable wrist watch of which first main unit is fitted to a wrist, a foldable calculator.

It can be exemplified that a foldable PDA displays on liquid crystal display, an image such as a calendar, a time, a schedule, an illustration, a facial photograph, a game application, a map, an internet home page, a vignette, or an electrical spectacular, when the second main unit is close, and displays an image such as a document creation screen, a mail operation screen, or a setting screen, when the second main unit is open.

Moreover, an openable and closable wrist watch displays, on liquid crystal display, an image such as a calendar or a time, when the second main unit is closed, and displays an image such as an alarm setting screen or a schedule setting screen, when the second main unit is open.

Moreover, although an information device is explained in the above embodiments in which a liquid crystal display according to the invention is used as the display of the information device and an image displayed by the same liquid crystal display can be viewed when the second main unit having the display is open or closed, the liquid crystal display is not limited to the examples described above. For example, the liquid crystal display may be used to serve both as a cover and a display for household electrical equipment, such as a refrigerator, a microwave oven, or an air-conditioner, provided with setting switches that are not always used, so as to hide these switches behind the cover. Moreover, because an image can be viewed from both sides of the first polarizing means and the second polarizing means of the liquid crystal display according to the invention, the display can be used as a display for such games as played by two opponents facing each other.

Embodiment 2

Figure 8:
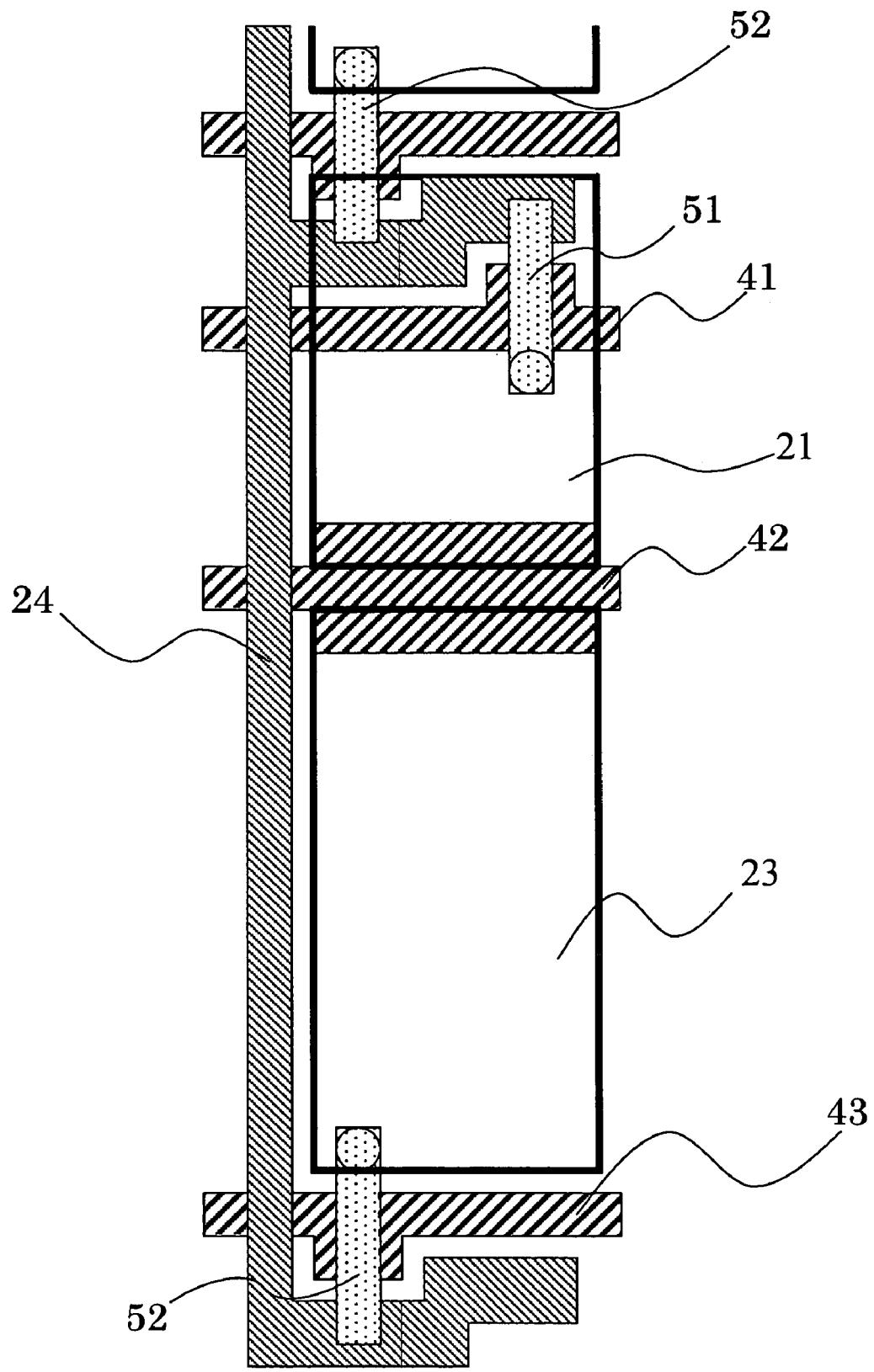
FIG. 8 is a plane view illustrating a pixel portion of another modified liquid crystal display panel of a liquid crystal display according to the invention.

FIG. 8 is a plane view illustrating a structure of thin-film transistors, wirings, and electrodes formed on the second substrate 17 according to Embodiment 2. Because other structures are the same as those of the liquid crystal display in Embodiment 1, the explanations are omitted.

In this Embodiment 2, the first thin-film transistor 51 and the second thin-film transistor 52 are disposed in a hounds tooth pattern.

Thereby, the gate electrodes of the first thin-film transistor 51 and the second thin-film transistor 52 can be disposed overlapped on the gate wiring 41 for a reflecting member and the gate wiring 43 for a transmitting member in their extending direction. By overlapping and disposing the gate electrodes, an area for forming a transistor in the gate wiring direction can be narrowed. Thereby, an aperture rate can be increased, so that images can be displayed more brightly.

Embodiment 3

Because the configuration of this Embodiment 3 is the same as that of Embodiment 1, the explanations are omitted. In this Embodiment 3, the second main unit 3 is used in an open state.

In this Embodiment 3, signals are independently applied to the reflection electrode 21 and the second transparent electrode 23, so that different images are displayed on both sides.

In more particular, an image is displayed on the first front light 6 side by lighting the first front light 6 and driving the reflection electrode 21, and the other image is displayed on the second front light 7 side by driving the second transparent electrode 23.

Different images can be displayed on both sides at the same time by operating the liquid crystal display as described above. Moreover, when the different images are displayed on both sides, the images can be displayed without using two liquid crystal panels.

Although in this Embodiment 3, a case is explained using a mobile telephone, the invention is not limited to mobile phones, but can be applied to not only a mobile telephone but also information devices such as PDAs, and various advertising panels.

Embodiment 4

The characteristic of this Embodiment 4 is that the light sources 11 of the first and second front lights of Embodiment 1 each use a three-primary-color (red, green, blue) light-emitting diode. Because the other configurations other than that are the same as those of Embodiment 1, the explanations are omitted.

Each color of the three-primary-color light-emitting diode is alternately turned on, and the liquid crystal is driven, by a field sequential method, to display, synchronized with the turning-on timing of each color, a red image, a green image, and a blue image fields, respectively.

By using this driving method, a color image can be displayed without using a color filter that is used in a liquid crystal display for general color displaying. Because a color filter is not used, transmittance reduction due to a color filter can be prevented, and the brightness is increased accordingly.

Moreover, because a color filter is not included, a liquid crystal display capable of displaying clear color can be realized, which enables to provide a liquid crystal display that looks like a transparent cover of an information terminal.

In addition, the technical scope of the present invention is not limited to the above embodiments, but various modifications can be added without departing from the scope of the invention.

For example, although a case of a liquid crystal display using a TFT system is explained, a liquid crystal display using a simple matrix system can also be used.

INDUSTRIAL APPLICABILITY

A liquid crystal display according to the present invention is used particularly for a liquid crystal display installed in a mobile device such as a mobile telephone, a mobile information terminal, or a personal digital assistance, as well as used as a liquid crystal display, such as an advertising panel, that displays different images on both sides thereof.

What is claimed is:

1. A two sided liquid crystal display device, comprising:
a liquid crystal cell, wherein pixels having independently driven reflecting and transmitting members are arranged in a matrix, said liquid crystal cell being composed of a first substrate,
a second substrate having pixel driving members, and
a liquid crystal sandwiched between the first substrate and the second substrate;
a first polarizing means disposed facing the first substrate;
a second polarizing means disposed facing the second substrate;
a first front light disposed outside the first polarizing means; and
a second front light disposed outside the second polarizing means,
wherein the reflecting members and the transmitting members are independently driven in order to display images on both sides of the liquid crystal display at the same time, and
the image displayed on one side by the reflecting members and the image displayed on an opposite side by the transmitting members are different.

2. A liquid crystal display as recited in claim 1, wherein the reflecting members display black.

3. A liquid crystal display as recited in claim 1, wherein the reflecting members display white.

4. A liquid crystal display as recited in claim 1, wherein a reflection-polarizer film is disposed between the second substrate and the second polarizing means.

5. An information device comprising a displaying means, the displaying means being a liquid crystal display as recited in claim 1.

6. An information device as recited in claim 5, further comprising:
a first main unit;
a second main unit, having the displaying means, connected to the first main unit openably and closably with respect to the first main unit; and
an open/close judgment means for judging whether the second main unit is open or closed; wherein
the first front light is lighted when the second main unit is open.

7. A liquid crystal display as recited in claim 1, comprising:
a plurality of said pixels, each having one said reflecting member and one said transmitting member, arranged between said first and second substrates and in contact with liquid crystal material of said liquid crystal cell.

8. A liquid crystal display as recited in claim 1, comprising:
a plurality of said pixels, each having one said reflecting member and one said transmitting member, wherein
said reflecting member has a reflecting electrode,
said transmitting member has a transmitting electrode,
said reflecting electrode and said transmitting electrode are insulated from each other.

9. A liquid crystal display as recited in claim 8, wherein electric voltage applied to said reflecting electrode and electric voltage applied to said transmitting electrode are independently controlled.

* * * * *